United States Patent
Zheng

(10) Patent No.: US 6,309,585 B1
(45) Date of Patent: Oct. 30, 2001

(54) CURABLE CASTING COMPOSITIONS HAVING A HIGH REFRACTIVE INDEX AND HIGH IMPACT RESISTANCE

(75) Inventor: Qiang Zheng, Fremont, CA (US)

(73) Assignee: Rodenstock North America, Inc., Hayward, CA (US)

( * ) Notice: Subject to any disclaimer, the term of this patent is extended or adjusted under 35 U.S.C. 154(b) by 0 days.

(21) Appl. No.: 09/298,537

(22) Filed: Apr. 23, 1999

(51) Int. Cl.[7] .............................. B29C 35/08; G02B 3/00; C08F 2/50; C08F 20/20; C08F 20/30
(52) U.S. Cl. .............................. 264/496; 522/18; 522/39; 522/42; 522/44; 522/46; 522/60; 522/64; 522/181; 522/182; 526/281; 526/286; 526/289; 526/309; 526/313; 351/159; 359/642; 359/652; 385/144
(58) Field of Search ........................... 522/182, 181, 522/18, 75, 39, 42, 44, 46, 60, 64; 526/72, 281, 309, 313, 286, 289; 264/496, 494; 359/642, 652; 385/144; 351/159

(56) References Cited

U.S. PATENT DOCUMENTS

| | | | |
|---|---|---|---|
| 4,306,780 | 12/1981 | Tarumi et al. | 351/159 |
| 5,373,033 | 12/1994 | Toh et al. | 522/96 |
| 5,442,022 | 8/1995 | Keita et al. | 526/309 |
| 5,502,139 | 3/1996 | Toh et al. | 526/284 |
| 5,545,828 | 8/1996 | Keita et al. | 526/72 |

*Primary Examiner*—Susan W. Berman
(74) *Attorney, Agent, or Firm*—Needle & Rosenberg, P.C.

(57) ABSTRACT

A high refractive index composition comprising a core resin mixture comprising a mixture of ethoxylated bisphenol A di(meth)acrylates and/or their derivatives having variable degrees of ethoxylation to provide enhanced impact resistance and refractive index.

41 Claims, No Drawings

CURABLE CASTING COMPOSITIONS HAVING A HIGH REFRACTIVE INDEX AND HIGH IMPACT RESISTANCE

FIELD OF THE INVENTION

The present invention relates to curable casting resin compositions that may be used in the formation of a variety of materials, including, but not limited to, lenses, camera optics, prisms and video disks.

BACKGROUND OF THE INVENTION

Ophthalmic lenses produced in industry must meet certain requirements for their intended use. For example, as mandated by the U.S. Food and Drug Administration (FDA), ophthalmic lenses should have sufficient impact resistance in addition to having acceptable optical properties. The performance and quality of lenses has been improved with the addition of scratch resistant coatings, anti-reflective (AR) coatings, UV protection and lens materials with high refractive index and high Abbe value. Further, lens cosmetics have also been improved by aspheric and progressive lens designs.

Many efforts in fonnulating UV curable casting resin compositions have been made to produce thinner lenses having a high refractive index. By increasing the refractive index of the lens materials, the edge thickness of minus-prescripted lenses and center thickness of plus-prescripted lenses is reduced. Reducing edge and center thicknesses of lenses provides functional advantages such as lighter weight and better cosmetics. Representative examples of UV curable casting resin formulations for forming lenses are described below.

U.S. Pat. No. 4,306,780 discloses high index lens formulations comprising three types of materials: (a) 3–70% of one or more of ethoxylated bisphenol A di(meth)acrylates, (b) 30–97% of high index reactive diluents, and (c) 0–67% of low index methacrylate(s). Based on the information provided in the patent disclosure, low impact resistance and inferior thermomechanical properties are expected from the high refractive index lenses made from these formulations because of the large amount of reactive diluent used in the formulations.

U.S. Pat. Nos. 5,442,022 and 5,545,828 disclose lens formulations comprising (a) at least 50% of a monomer ormixture of monomers having formula (A), (b) 0–50% of one or more mono- or poly-functional vinyl or (meth) acrylate comonomers, and (c) 0.5 to 15% of allyl alcohols or their derivatives. Lenses produced from a homopolymer of formula (A) have a refractive index greater than or equal to 1.55; however, these lenses have an inferior physical/cosmetic property in that they are very yellow in color. Further, although incorporating components (b) and (c) into the lens formulations reduces the yellowness of the resulting lens, lens formulations comprising components (a), (b) and (c) produce lenses having an undesired lower refractive index. Also, the typical time for thermally curing these lens formulations is more than 20 hours. A curing time of this length drastically reduces lens manufacturing efficiency. The formula disclosed in U.S. Pat. Nos. 5,442,022 and 5,545,828 may be represented by: Formula A

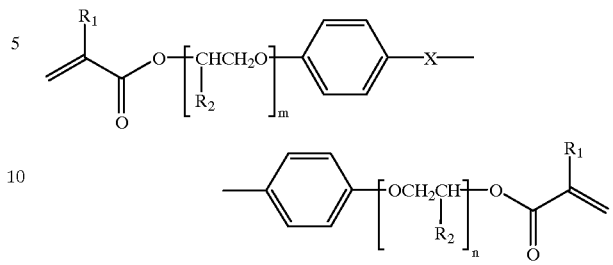

wherein $R_1$, and $R_2$ are H or $C_1$–$C_6$alkyl; X is O, S, $SO_2$, $CO_2$, $CH_2$, CH=CH or $C(CH_3)_2$; and m+n is 0–10.

U.S. Pat. No. 5,373,033 discloses casting resin formulations with (a) 5–60% of polyoxyalkylene glycol di(meth)acrylates, (b) 10–60% of bisphenol-based monomers having the general formula (B) and a second high index component to adjust the refractive index, and (c) 2.5–20% of urethane (meth)acrylates. The impact resistance for these formulations was not reported; however, the impact resistance is expected to be improved due to the introduction of urethane (meth)acrylates into the formulation. The reported refractive index of the cured sample is no more than 1.55. The formula disclosed in U.S. Patent No. 5,373,033 may be represented by:

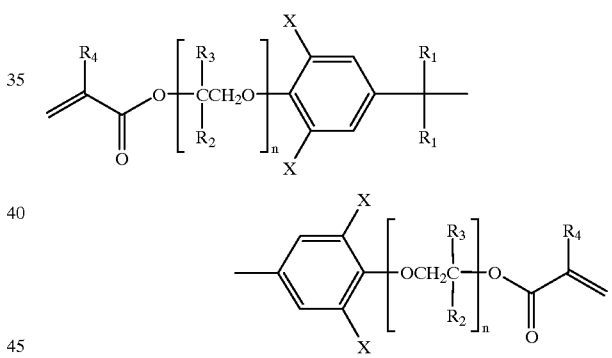

wherein $R_1$ is H, $CH_3$ or $CH_2CH_3$; $R_2$ is H, $CH_3$ or $CH_2CH_3$; $R_3$ is H, $CH_3$ or OH; $R_4$ is H, $CH_3$ or $CH_2CH_3$; X is a halogen (preferably Cl, Br or I) or hydrogen; and n is 0–8.

The lenses produced using these high index materials represented above by formulae (A) and (B) may have one or more of the shortcomings mentioned above. For instance, the high index materials of formulae (A) and (B) are mixed with at least 2 other types of materials to adjust index, viscosity and impact resistance in order to obtain lenses with reasonable overall properties. However, the impact resistance and themomechanical properties of these lenses are expected to be inferior. Further improvement is needed to formulate high index casting resins capable of producing much higher quality lenses by developing new high index materials.

Steps have also been taken to impart UV protection in lenses produced from the aforementioned formulations. These steps are typically accomplished by dipping the cured lenses in a UV tinting bath in separate steps. However, the UV tinting process tends to introduce yellowness into the lens and increases the cost of lenses.

Thus, there is a need to formulate a low viscosity casting resin formulation that is curable in a short amount of time and produces lenses having a high refractive index and excellent impact resistance. In particular, there is a need for high impact resistance in lenses having a center thickness of 1 mm. That way, true thin and light high refractive index lenses having the required impact resistance can be produced. Further, there is a need for lenses having at least 99% inherent UVA protection up to 380 nm. Having inherent UV protection eliminates additional UV tinting process steps and the resulting yellowness in the lens. Lastly, a casting resin composition of low viscosity enables easier processing in the mold-filling stage and prevents flow lines and bubbles in the cured lenses.

SUMMARY OF THE INVENTION

The present invention is generally directed to a low viscosity casting resin composition that can be cured under radiation to produce high refractive index lenses with excellent impact resistance and inherent UV protection, even on lenses with 1 mm center thickness. By mixing ethoxylated bisphenol A di(meth)acrylates of varying degrees of ethoxylation, compositions can be obtained with an enhanced balance of impact resistance and refractive index. Moreover, the present invention is directed to a curable casting resin composition having a UV absorber therein to provide more than 99% inherent UVA protection.

In one aspect, the present invention is directed to a high refractive index composition comprising:

a core resin mixture comprising (i) an ethoxylated bisphenol A di(meth)acrylate having the formula (I):

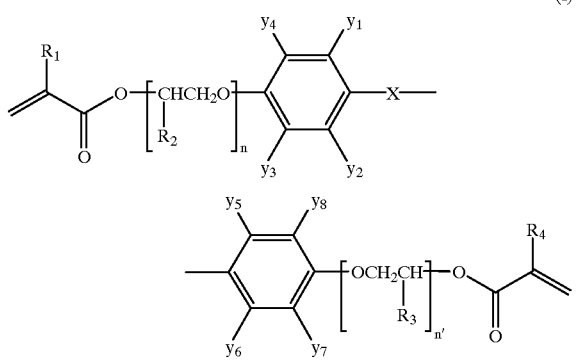

wherein n and n' independently are 0–30, $R_1$–$R_4$ independently represent H or $C$–$C_6$ alkyl, X is O, S, $SO_2$, $CO_2$, $CH_2$, CH=CH, $C(CH_3)_2$ or a single bond, and $y_1$–$y_8$, independently represent H, OH, halogen, mercaptan or $C_{1-C4}$ alkyl, (ii) an ethoxylated bisphenol A di(meth)acrylate having the formula (11):

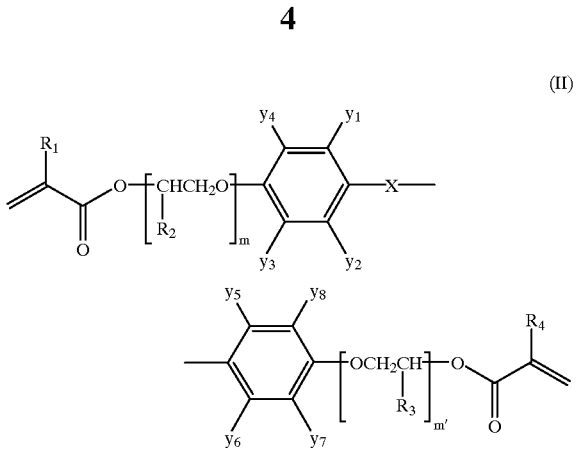

wherein m and m independently are 1–30, $R_1$–$R_4$ independently represent H or $C_1$–$C_6$ alkyl, X is O, S, $SO_2$, $CO_2$, $CH_2$, CH=CH, $C(CH_3)_2$ or a single bond, and $y_1$–$y_8$ independently represent H, OH, halogen, mercaptan or $C_1$–$C_4$ alkyl, and (iii) a reactive diluent;

the mixture having greater than 70 parts by weight of the composition of the combined components (i) and (ii), and less than 30 parts by weight of the composition of component (iii), based on the total parts by weight of the core resin equaling 100, and n and n' being less than m and m' so as to provide a refractive index of greater than 1.53 and a high impact resistance after curing the composition.

In another aspect, the composition of the present invention comprises (a) a core resin comprising (i) greater than 70 parts by weight of the composition of an ethoxylated bisphenol A di(meth)acrylate or a mixture of ethoxylated bisphenol A di(meth)acrylates having the formula (I):

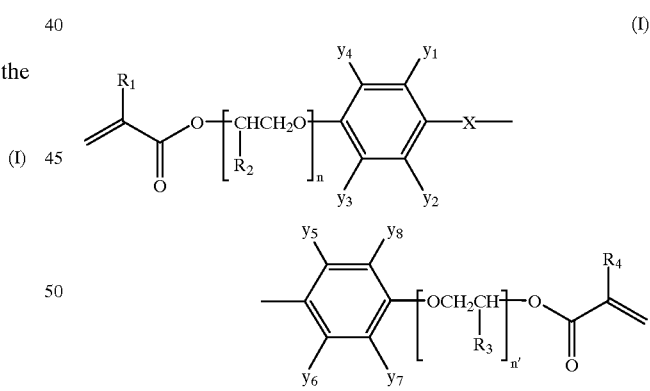

wherein n and n' independently are 0–30, $R_1$–$R_4$ independently represent H or $C_1$–$C_6$ alkyl, X is O, SO $SO_2$, $CO_2$, $CH_2$, CH=CH, $C(CH_3)_2$ or a single bond, and $y_1$–$y_8$ independently represent H, OH, halogen, mercaptan or $C_1$–$C_4$ alkyl, (ii) less than 30 parts by weight of the composition of a reactive diluent, based on the total parts by weight of the core resin equaling 100; and (b) up to 2 parts by weight of a UV absorber per 100 parts by weight of the core resin.

The present invention is also directed to a method of forming a cured article from the compositions of the present invention. The method comprises the steps of: (a) filling a mold with a high refractive index curable resin composition of the present invention; (b) curing the composition of step (a) by exposure to a radiation source thereby forming a cured article; (c) demolding the cured article; and (d) annealing the cured article. Preferably, the article is a lens.

DETAILED DESCRIPTION OF THE INVENTION

The present invention may be understood more readily by reference to the following detailed description of particular embodiments of the invention and the specific examples included therein.

Before the present compositions and methods are disclosed and described, it is to be understood that this invention is not limited to specific synthetic methods or to particular formulations, as such may, of course, vary. It is also to be understood that the terminology used herein is for the purpose of describing particular embodiments only and is not intended to be limiting.

In this specification and in the claims which follow, reference will be made to a number of terms which shall be defined to have the following meanings.

The singular forms "a," "an" and "the" include plural referents unless the context clearly dictates otherwise.

"High refractive index" or "high index" when used in reference to the polymer formed from a casting resin composition means that the cured polymer preferably has a refractive index (RI) of at least 1.53, and more preferably of at least 1.56.

"Inherent UV protection" when used in reference to the polymer formed from a casting resin composition of this invention means that the cured polymer having a UV absorber therein preferably has ultra violet (UV) blockage of 100% UVB and at least 95% and more preferably of at least 99% UVA (up to 380 nm).

"Core resin" when used in reference to a curable casting resin composition of this invention refers to a resin having the combination of an ethoxylated bisphenol A di(meth) acrylate monomer and/or mixtures thereof and a reactive diluent.

The term "ethoxylated bisphenol A di(meth)acrylate" (referred to herein as "the first compound and the second compound") refers to itself as well as its derivatives as outlined in formulae (I) and (II).

The term "(meth)acrylate" or "(meth)acrylate mixtures" when used in reference to the curable casting resin composition of this invention refers to an acrylate monomer wherein the monomer or monomer mixture may be a methacrylate or acrylate.

The term "reactive diluent" refers to a radically polymerizable monomer used to reduce the concentration of the cthoxylated bisphenol A di(meth)acrylate and/or mixtures thereof to achieve the presently described desirable and beneficial effects, especially low viscosity, high refractive index and/or better thermomechanical properties.

The amount of reactive diluent used in the core resin varies according to the types and amounts of ethoxylated bisphenol A di(meth)acrylate used, and is used in an amount to effect a high refractive index without sacrificing a high impact resistance imparted to the resulting cured substrate or lens.

The curable casting resin composition of this invention may be a core resin copolymer comprising an ethoxylated bisphenol A di(meth)acrylate monomer and a radically polymerizable reactive diluent monomer. This composition, which may be subsequently cured into a high refractive index lens, for example, can easily be obtained by copolymerizing any one ethoxylated bisphenol A di(meth)acrylate monomer component and the reactive diluent monomer component, or by homopolymerizing an ethoxylated bisphenol A di(meth)acrylate monomer without reactive diluent.

The present invention is generally directed to a low viscosity, curable casting resin composition for producing articles having a high refractive index, high impact strength and inherent UV protection. The casting resin compositions are radiation and/or thermally curable. More preferably, the casting resin compositions of this invention are UV radiation curable.

In one embodiment, the high refractive index curable composition comprises a core resin mixture comprising:

(i) an ethoxylated bisphenol A di(meth)acrylate having the formula (I):

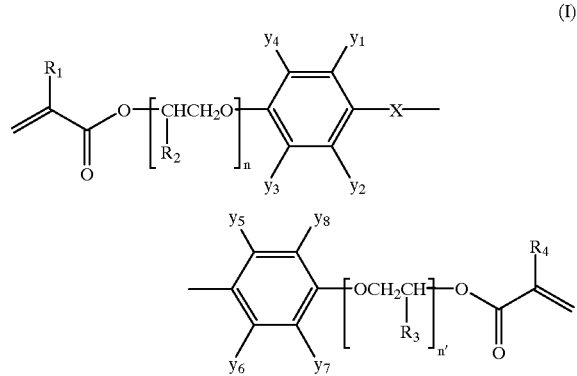

wherein n and n' independently are 0–30, $R_1$–$R_4$ independently represent H or $C_1$–$C_6$ alkyl, X is O, S, $SO_2$, $CO_2$, $CH_2$, CH=CH, $C(CH_3)_2$ or a single bond, and $y_1$–$y_8$ independently represent H, OH, halogen, mercaptan or $C_1$–$C_4$ alkyl, (ii) an ethoxylated bisphenol A di(meth)acrylate having the formula (II):

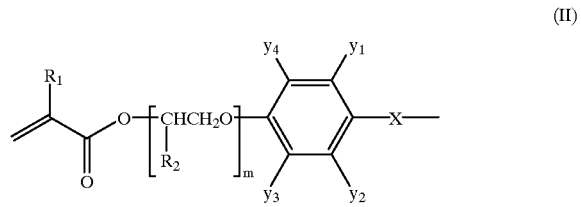

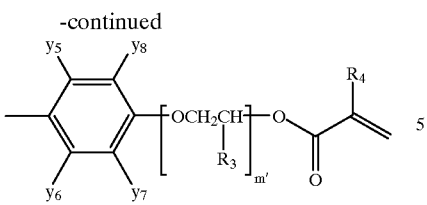

wherein m and m' independently are 1–30, R–$R_4$ independently represent H or $C_1$–$C_6$ alkyl, X is O, S, $SO_2$, $CO_2$, $CH_2$, CH=CH, $C(CH_3)_2$ or a single bond, and $y_1$–$y_8$, independently represent H, OH, halogen, mercaptan or $C_1$–$C_4$ alkyl, and (iii) a reactive diluent;

the mixture having greater than 70 parts by weight of the composition of the combined components (i) and (ii), and less than 30 parts by weight of the composition of component (iii), based on the total parts by weight of the core resin equaling 100, and n and n' being less than m and m so as to provide a refractive index of greater than 1.53 and a high impact resistance after curing the composition.

The di(meth)acrylates of formulae I and II may preferably be present at 72 parts, more preferably 75 parts, even more preferably at 77 parts, and most preferably at 80 parts by weight of the composition of combined components (i) and (ii).

In formula I: n and n' preferably are 0–15, more preferably 0–8, and even more preferably 0–4; one or both of $R_2$ and $R_4$ preferably represent H or $CH_3$, and more preferably $CH_3$; one or both of $R_2$ and $R_3$ preferably represent H; X preferably represents $C(CH_3)_2$; and/or one or more of $y_1$–$y_8$ preferably represent H.

In formula II m and m' preferably are 1–15, more preferably 3–12, and even more preferably 5–8; one or both of $R_1$ and $R_4$ preferably represent H or $CH_3$, and more preferably $CH_3$; one or both of $R_2$ and $R_3$ preferably represent H; X preferably represents $C(CH_3)_2$; and/or one or more of $y_1$–$y_8$ preferably represent H.

The degree of alkoxylation in formulae I and II can generally be varied to give the high refractive index and superior impact resistance of the invention throughout the scope of compounds covered by the generic structure for formulae I and II. The impact resistance of the cured compositions of this invention may, of course, vary. The resin preferably gives a composition upon polymerization and curing that passes the FDA required drop ball #1 impact resistance test, more preferably passes the drop ball #10 test, and even more preferably passes the drop ball #13 test. High impact resistance, for purposes of defining the cured compositions of this invention, means at least passing the drop ball #1 impact resistance test. One is able, by balancing the alkoxylation in formulae I and II, to obtain a final composition from many combinations of formulae I and II that satisfies the physical properties of the inventive compositions.

In a second embodiment, the high refractive index curable composition comprises a core resin mixture comprising:

(i) an ethoxylated bisphenol A di(meth)acrylate having the formula (I):

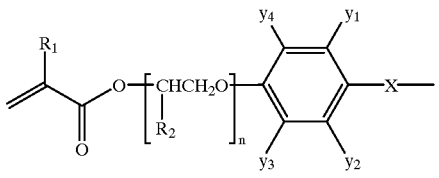

wherein n and n' independently are 0–4, $R_1$ and $R_4$ independently represent H or $CH_3$, $R_2$ and $R_3$ are H, X is $C(CH_3)_2$, and $y_1$–$y_8$ are H, (ii) an ethoxylated bisphenol A di(meth)acrylate having the formula (II):

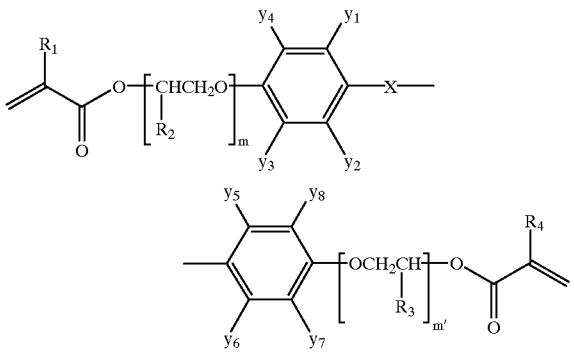

wherein m and m' independently are at least 5, $R_1$ and $R_4$ independently represent H or $CH_3$, $R_2$ and $R_3$ are H, X is $C(CH_3)_2$, and $y_1$–$y_8$ are H, and (iii) a reactive diluent;

the mixture having greater than 70 parts by weight of the composition of the combined components (i) and (ii), and less than 30 parts by weight of the composition of component (iii), based on the total parts by weight of the core resin equaling 100.

In the first and second embodiments, the curable composition preferably comprises a core resin mixture wherein (a) component (i) comprises at least 5 parts by weight of the composition of (1) the ethoxylated bisphenol A di(meth) acrylate of formula (I) or (2) a mixture of ethoxylated bisphenol A di(meth)acrylates of formula (I), and n and n' independently are 0–4, and (b) component (ii) comprises 10–75 parts by weight of the composition of (1) the ethoxylated bisphenol A di(meth)acrylate of formula (II) or (2) a mixture of ethoxylated bisphenol A di(meth)acrylates of formula (II), and m and m' independently are at least 5.

Preferably, the curable composition of these embodiments comprises a core resin mixture wherein (a) component (i) comprises at least 30 parts by weight of the composition of the ethoxylated bisphenol A di(meth)acrylate of formula (I), and n and n' are 1, and (b) component (ii) comprises 10 to 55 parts by weight of the composition of a mixture of ethoxylated bisphenol A di(meth)acrylates of formula (II), in which m and ml independently are 6 and 15.

More preferably, the curable composition of these embodiments comprises a core resin mixture wherein (a) component (i) comprises at least 30 parts by weight of the composition of the ethoxylated bisphenol A di(meth)acrylate of formula (I), and n and n are 1, and (b) component (ii) comprises 20–65 parts by weight of the composition of the ethoxylated bisphenol A di(meth)acrylate of formula (II), and m and m' are 6.

In a third embodiment, the high refractive index curable composition comprises (a) a core resin comprising
(i) greater than 70 parts by weight of the composition of an ethoxylated bisphenol A di(meth)acrylate or a mixture of ethoxylated bisphenol A di(meth)acrylates having the formula (I):

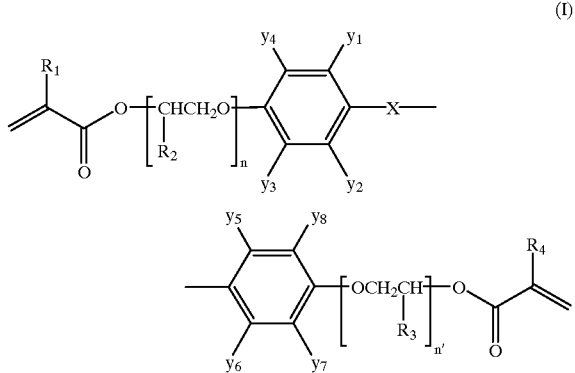

wherein n and n' independently are 0–30, $R_1$–$R_4$ independently represent H or $C_1$–$C_6$ alkyl, X is O, S, $SO_2$, $CO_2$, $CH_2$, $CH=CH$, $C(CH_3)_2$ or a single bond, and $y_1$–$y_8$ independently represent H, OH, halogen, mercaptan or $C_1$–$C_4$ akyl,
(ii) less than 30 parts by weight of the composition of a reactive diluent, based on the total parts by weight of the core resin equaling 100; and
   (b) up to 2 parts by weight of a UV absorber per 100 parts by weight of the core resin.

The high index curable composition of this invention having a core resin (component (a)) and a UV absorber (component (b)) therein preferably comprises a core resin (component (a)) comprising from about 75 to about 85 parts by weight of the ethoxylated bisphenol A di(meth)acrylate of formula (I) (component (i)) and from about 15 to about 25 parts by weight of the reactive diluent (component (ii)), based on the total parts by weight of the core resin equaling 100.

In the third embodiment, component (i) of the core resin preferably comprises at least 5 parts by weight of the core resin of (1) the ethoxylated bisphenol A di(meth)acrylate of formula (I), and n and n independently are 0–2 or (2) a mixture of ethoxylated bisphenol A di(meth)acrylates of formula (I), and n and n' independently are 0–2, and 10–75 parts by weight of the core resin of (1) the ethoxylated bisphenol A di(meth)acrylate of formula (I), and n and n' independently are 3–15 or (2) a mixture of ethoxylated bisphenol A di(meth)acrylates of formula (I), and n and n' independently are 3–15.

More preferred for this third embodiment, component (i) of the core resin comprises at least 30 parts by weight of the core resin of the ethoxylated bisphenol A di(meth)acrylate of formula (I), and n and n' are 1, and 20–65 parts by weight of the composition of (1) the cthoxylated bisphenol A di(meth)acrylate of formula (I) wherein n and n independently are 3–15 or (2) a mixture of ethoxylated bisphenol A di(meth)acrylates of formula (I), and n and n' independently are 3–15.

Further, the high index curable resin compositions of this invention may include additional components such as thermal or UV initiators or other known additives such as light stabilizers. Moreover, the high index resin compositions are preferably UV curable.

All of the embodiments described above are low viscosity curable resin compositions which may be used to produce lenses having a refractive index of at least 1.53, and preferably of at least 1.56. The cured resin compositions have excellent impact strength even with lenses having 1 mm center thickness. In addition, the cured resin compositions have an Abbe value of 38. In addition to the superior properties above, the embodiment of the high index curable composition having a UV absorber therein has at least 95%, preferably at least 99% inherent UVA protection up to 380 nm and 100% inherent UVB protection.

The methacrylate monomer of ethoxylated bisphenol A di(meth)acrylate is preferred over the acrylate monomer. In formulae (I) and (II), as the number (n, n', m and/or m') of ethylene oxide units increases, the impact strength increases; however, the refractive index decreases. It is preferred, therefore, that the proper balance of ethoxylated bisphenol A di(meth)acrylates of formulae (I) and (II) having different degrees of ethoxylation be achieved.

The core resin preferably comprises less than 30 parts by weight of reactive diluent, preferably a higher refractive index (RI>1.51) reactive diluent. Preferably, the core resin comprises 5–20 parts by weight of reactive diluent per hundred parts core resin. High refractive index reactive diluents are preferably introduced to raise the overall refractive index and to adjust the overall properties of the casting resin composition.

The reactive diluents useful in the high index casting resin compositions of this invention include 1,6-hexanediol di(meth)acrylate, trimethylolpropane tri(meth)acrylate, tri (meth)acrylate, isobornyl (meth)acrylate, vinyl benzoate, vinyl 4-t-butyl benzoate, styrene, divinyl benzene and mixtures thereof. The more preferred reactive diluents are vinyl benzoate, vinyl t-butyl benzoate, styrene, and mixtures thereof. The most preferred reactive diluent for this composition is styrene.

UV absorbers can be used to impart inherent UV protection to the high index curable casting resin compositions of this invention. The high refractive index composition of this invention preferably comprises up to 2 parts by weight of UV absorber per 100 weight parts of the core resin composition. More preferably, the composition comprises up to 0.5 parts by weight of UV absorber per 100 weight parts of the core resin. Preferred UV absorbers are benzotrizole derivatives, including but not limited to TINUVIN 328, TINUVIN 384, TINUVIN 900, TINUVIN 1130 and TINUVIN 400, manufactured by Ciba-Geigy of Hawthorne, N.Y. TINUVIN 328 is the more preferred UV absorber. Chemically, TINUVIN 328 is 2-(3', 5'-bis(1,1-dimethylpropyl)-2'-hydroxyphenyl)-2H-benzotriazole.

Up to 2 parts by weight of a UV initiator per 100 parts by weight of core resin may be used in the composition. Preferably, 0.1–1.5 parts by weight of UV initiator is used based on the weight of the core resin. UV initiators which are useful in the composition include, but are not limited to, benzophenone, 2,2-dimethoxy-2-phenyl acetophenone, 1-hydroxycyclohexyl phenyl ketone, 2-methyl-1-[4-(methylthio)phenyl]-2-morpholino propan-1-one, 2-hydroxy-2-methyl-1-phenyl-propan- 1 -one, bis(2,6-dimethoxybenzoyl)-2,4,4-trimethylpentyl phosphine oxide, 2,4,6-trimethylbenzoyl diphenylphosphine oxide, bis(2,4,6-trimethylbenzoyl)-phenylphosphine oxide and mixtures thereof.

Preferred UV initiators include, but are not limited to, 2,4,6-trimethylbenzoyl diphenylphosphine oxide, 2-hydroxy-2-methyl-1-phenyl-propan-1-one and 1-hydroxycyclohexyl phenyl ketone and mixtures thereof. A more preferred UV initiator comprises the mixture of 2,4,6-trimethylbenzoyl diphenylphosphine oxide and 2-hydroxy-2-methyl-1-phenyl-propan-1-one, most preferably by the weight ratio of 1/9–9/1.

The initiator in the composition may also be a mixture of UV and thermal initiators. Thermal initiators which are useful in the composition include, but are not limited to, t-amyl peroxy-2-ethylhexanoate, t-butylperoxy-2-ethylhexanoate, t-butyl peroxyl-2-methylbenzoate, 1,1-di-(t-butylperoxy)-3,3,5-trimethylcyclohexane, t-butyl peroxy-3,5,5-trimethylhexanoate, t-butylperoxy 2-ethylhexyl carbonate, dibenzoyl peroxide, t-amyl peroxybenzoate and mixtures thereof.

Preferred thermal initiators include, but are not limited to, t-amyl peroxy-2-ethylhexanoate, t-butyl peroxy-2-ethylhexanoate, t-butyl peroxy-3,5,5-trimethylhexanoate and mixtures thereof. In one particular embodiment, the composition comprises 0.1–1.5 and 0.01–1.0 parts, and more preferably, 0.1–1.0 and 0.01–0.5 parts by weight of a mixture of UV and thermal initiators, per 100 parts by weight of the core resin, respectively.

A light stabilizer may be present in the composition of this invention. Preferably, up to 1.0 part by weight of a light stabilizer per 100 parts by weight of the core resin may be used. Preferred light stabilizers include, but are not limited to, TINUVIN 123, TINUVIN 292 AND TINUVIN 144, also manufactured by Ciba-Geigy Corp. of Hawthorne, N.Y. The most preferred light stabilizer is bis(1,2,2,6,6-pentamethyl-4-piperidinyl)sebacate. They do not act by absorbing UV light, but rather by scavenging free radicals. The UV absorber also acts as a light stabilizer to slow down the degradation caused by UV radiation.

Some advantageous features of preferred compositions of the present invention are:
1. The viscosity of compositions is very low so that it can be easily processed in the filling stage;
2. The compositions can be cured in 5 min. or less with UV exposure;
3. The cured lens substrates having a UV absorber therein provide at least 99% inherent UVA up to 380 nm and 100% UVB blockage so that no secondary UV treatment and its related processes are required; and/or
4. The cured lenses exhibit a refractive index of 1.56, excellent impact resistance even with 1mm center thickness, and very good thermomechanical properties.

The viscosity of the compositions of this invention is preferably less than 1000 cps, and more preferably is less than 400 cps, at ambient temperature (22°–24° C.).

The additives for the compositions of this invention preferably comprise a UV absorber for promoting UV protection and/or a stabilizer for long term stability of the cured materials. Preferably, the composition comprises up to 2 parts by weight of a UV absorber per 100 parts by weight of the core resin and up to a total of 3 parts by weight of combined initiators per 100 parts by weight of the core resin. The initiators may be UV and/or thermal.

Having inherent UV protection in the cured lenses of the present invention eliminates the need for typical UV tinting and related process steps. As such, the lens manufacture cycle time and the cost of manufacture can be dramatically reduced.

In a further aspect of the present invention, a polymeric article is formed from a composition as described above. The polymeric article may be a lens or other optical article. The optical article may provide characteristics equal to or greater than those achievable with articles made from previously known formulations, but with a considerably reduced cure time, substantially increased throughput, excellent impact resistance and inherent UV protection. The optical article may be further characterized by having an increased refractive index without degrading other important lens physical properties such as density, impact resistance, color and rigidity (hardness and heat resistance).

The overall refractive index of optical articles produced from the compositions of the present invention are preferably from approximately 1.53 to 1.57, more preferably 1.55 to 1.56. The optical articles produced from the compositions of this invention include, but are not limited to lenses, prisms and video disks.

An article is produced according to this invention by processing and curing a composition of this invention. In one embodiment, a glass mold is filled with a composition as described herein and the composition is exposed to a radiation source while in the mold to cure the composition and form a cured article. The cured article is removed from the mold and the cured article is annealed. Preferably, the article is a lens. Preferably, the radiation source provides UV radiation for curing the composition. The radiation source may be a grid, mercury, xenon or any other appropriate actinic radiation source.

EXAMPLES

The following examples are put forth so as to provide those of ordinary skill in the art with a more complete disclosure and description of how the resin compositions claimed herein are made and evaluated. They are not intended to limit the scope of what the inventors regard as their invention. Efforts have been made to insure accuracy with respect to numbers (e.g., amounts, temperature, etc.) but some errors and deviations should be accounted for. Unless indicated otherwise, parts are by weight, temperature is in ° C. or is at room temperature and pressure is at or near atmospheric.

Viscosity was measured by Brookfield viscometer at ambient temperature (22–24° C.).

The FDA requires that the impact resistance of ophthalmic lenses conform to certain requirements as defined by the steel drop ball tests of the American National Standards Institute, Inc. (ANSI). The ANSI Z80.1—1979 (Revision of ANSI Z80.1—1972 approved Nov. 21, 1978) outlines the American National Standard Recommendations for impact resistance (steel drop ball test) for prescription ophthalmic lenses in section 4.8. According to ANSI Z80.1—1979, section 4.8.4, the impact resistance of ophthalmic lenses subject to individual tests is measured with a 15.00 mm (⅝ inch =0.625 inch) diameter steel ball weighing not less than 16 grams dropped from a height of not less than 127 cm. (50 inches), or an equivalent impact. Steel balls must comply with the requirements of ANSI specifications for metal balls, ANSI/AFBMA Std 10–1975, or the latest revision thereof, for chrome alloy steel (AISI Type E52100), of density 27.5 balls per pound, ball grade No. 25 or better.

The impact resistance of lenses resulting from the compositions of this invention was measured by dropping a series of steel balls (the specification for which is indicated in Table 1 below) from 50 inches until the sample was broken. The largest ball size that did not break the sample was recorded. The FDA requirement for ophthalmic lenses is passing the drop ball #1 test outlined in Table 1. The average drop ball value out of at least four flat samples having 2 mm thickness was recorded in Tables 2 and 3.

TABLE 1

Steel ball specification

| Drop ball | Diameter (inch) | Mass (g) |
|---|---|---|
| 1 | ⅝ | 16.02 |
| 2 | 11/16 | 21.33 |
| 3 | ¾ | 27.84 |
| 4 | 13/16 | 35.55 |
| 5 | ⅞ | 44.02 |
| 6 | 15/16 | 54.43 |
| 7 | 1 | 66.00 |
| 8 | 1 1/16 | 78.87 |
| 9 | 1 ⅛ | 95.18 |
| 10 | 1 3/16 | 112.01 |
| 11 | 1 ¼ | 128.78 |
| 12 | 1 5/16 | 151.05 |
| 13 | 1 ⅝ | 173.30 |
| 14 | 1 7/16 | 198.60 |
| 15 | 1 ½ | 225.55 |

Refractive index (RI) and Abbe value were measured by a refractometer at room temperature (22°–24°).

Shore D hardness was measured by a Durometer (type D). This is the measurement of sample hardness.

Flex modulus was measured by Instron according to ASTM D790 to monitor stiffness of a material.

Heat distortion temperature (HDT) was characterized by TMA with a micro three point bending set up according to ASTM D648 at the rate of 5° C./min and was reported as the onset temperature.

Glass transition temperature (Tg) was also measured by TMA at the rate of 5° C./min and was reported as the onset temperature.

UV transmission was measured by UV/VIS spectrometer.

Density was measured by an Ultrapycnometer.

Examples 1–3

Table 2 illustrates three examples of low viscosity casting formulations based on ethoxylated bisphenol A dimethacrylate (EBADMA) derivatives and high index reactive diluents. Physical properties of each formulation are also provided.

The formulations of examples 1–3 were mixed with 0.5 parts by weight of UV initiators, based on 100 parts by weight of the core resin. The UV initiators were 2-hydroxy-2-methyl-1-phenyl-propan-1-one and 2,4,6-trimethylbenzoyl diphenylphosphine oxide at the weight ratio of 20/1. The resulting resins were filled between two glass plates and cured into flat samples with 2 mm thickness under a Fusion System F300 lamp (3 passes each side under at 2.5 ft/min) without annealing. Examples 1 and 2 show the relationship between impact resistance and length of the ethylene oxide units (n) in EBADMA. A comparison of examples 1 and 3 in Table 2 indicates that styrene as a reactive diluent likely raises the refractive index more than vinyl benzoate.

TABLE 2

Formulations and physical properties of Examples 1–3

| | Formulations in Parts by Weight Based on 100 Total Parts | | | | | | Physical Properties | | | |
|---|---|---|---|---|---|---|---|---|---|---|
| Example | EBADMA (n = 1) | EBADMA (n = 15) | EBADMA (n = 6) | EBADMA (n = 3) | Vinyl benzoate | Styrene | Viscosity (cps) | Impact resistance | Refractive index | Shore D hardness |
| 1 | 50 | 20 | 10 | | 20 | | 205 | 5 | 1.556 | 80 |
| 2 | 50 | 20 | | 10 | 20 | | 205 | 3 | 1.557 | 81 |
| 3 | 53 | 20 | 10 | | | 17 | 220 | 5 | 1.561 | 81 |

Examples 4 and 5

Table 3 shows two additional examples. The formulations of examples 4 and 5 included EBADMA derivatives and styrene as the reactive diluent. The formulations also included additives. The additives were UV initiators, a thermal initiator, and a UV absorber. Specifically, 0.75 parts by weight of UV initiators, based on 100 parts by weight of core resin, consisting of 2-hydroxy-2-methyl-1-phenyl-propan-1-one and 2,4,6-trimethylbenzoyl diphenylphosphine oxide at the weight ratio of 1/1 were used. Further, 0.0125 parts by weight, based on 100 parts by weight of core resin, of t-butyl peroxy-3,5,5-trimethylhexanoate as a thermal initiator and 0.06 parts by weight, based on 100 parts by weight of core resin, of TINUVIN 328 as a UV absorber were used. The mixed resin was filled in the mold cavity and subjected to a low pressure mercury lamp (351 nm, 5 mm/cm$^2$) for 5 min from both sides, followed by an annealing process for 25 minutes at 249° F. in a conveyer oven.

TABLE 3

Formulations and physical properties of Examples 4 and 5

| | Formulations in Parts by Weight Based on 100 Total Parts | | | | Physical Properties | | | | | | | | |
|---|---|---|---|---|---|---|---|---|---|---|---|---|---|
| Example | EBADMA (n = 1) | EBADMA (n = 15) | EBADMA (n = 6) | Styrene | Viscosity (cps) | Impact resistance | Refractive index | Shore D hardness | Tg | HDT | Modulus (kpsi) | T% (315–380 nm) | Density (g/cc) |
| 4 | 53 | 20 | 10 | 17 | 220 | 7 | 1.561 | 81 | >74 | >65 | 286 | <1% | 1.18 |
| 5 | 33 | | 50 | 17 | 200 | 13* | 1.560 | 81 | >74 | >65 | 315 | <1% | 1.16 |

*Similar impact resistance was also observed on lenses with 1 mm center thickness The significant difference between examples 4 and 5 is the impact resistance. The impact resistance of example 5 is much higher than that of example 4. This demonstrates that the balance of the degree of ethoxylation (n) of the EBADMA derivatives in the formulation plays an important role in determining the impact resistance of the cured samples. For instance, incorporation of EBADMA where n=15 does not necessarily provide better impact resistance even though it has a higher degree of ethoxylation. Process conditions and additives also affect the final physical properties (compared with examples 3 with 4). Lenses with 1 mm center thickness made from example 5 also show similar impact resistance to that of flat samples. The Abbe value measured 38 at 25° C.

Throughout this application, where publications are referenced, the disclosures of these publications in their entireties are hereby incorporated by reference into this application in order to more fully describe the state of the art to which this invention pertains.

Finally, it is to be understood that various other modifications and/or alterations may be made without departing from the spirit of the present invention as outlined herein.

What is claimed is:

1. A high refractive index composition consisting essentially of:

a core resin mixture comprising (i) a first compound having the formula (I):

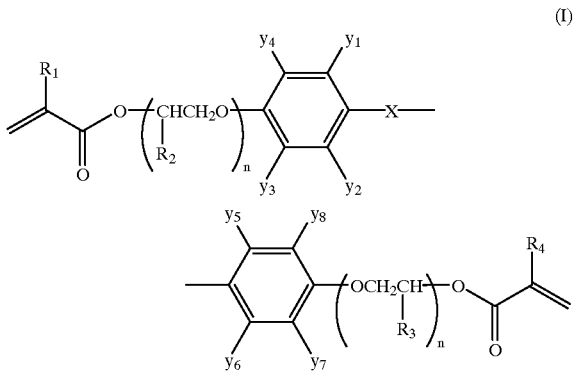

wherein n is from 0–30, $R_1$–$R_4$ independently represent H or $C_1$–$C_6$ alkyl, X is O, S, $SO_2$, $CO_2$, $CH_2$, CH=CH, $C(CH_3)_2$ or a single bond, and $y_1$–$y_8$ independently represent H, OH, halogen, mercaptan or $C_1$–$C_4$ alkyl, (ii) a second compound having the formula (II):

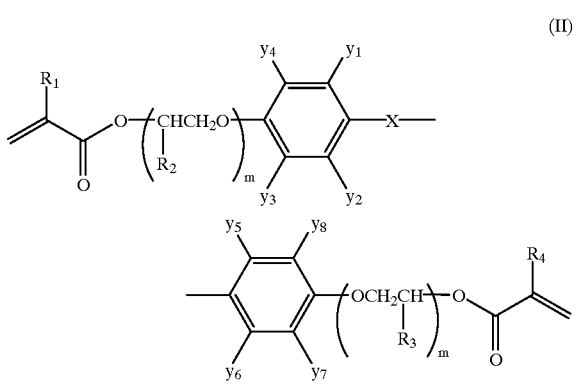

wherein m is from 1–30, $R_1$–$R_4$ independently represent H or $C_1$–$C_6$ alkyl, X is O, S, $SO_2$, $CO_2$, $CH_2$, CH=CH, $C(CH_3)_2$ or a single bond, and $y_1$–$y_8$ independently represent H, OH, halogen, mercaptan or $C_1$–$C_4$ alkyl, and (iii) a reactive diluent comprising 1,6-hexanediol di(meth)acrylate, trimethylolpropane tri(meth)acrylate, isobornyl (meth)acrylate vinyl benzoate, vinyl 4-t-butyl benzoate, styrene, divinyl benzene or a mixture thereof, the mixture having greater than 70 parts by weight of the composition of the combined components (i) and (ii), and less than 30 parts by weight of the composition of component (iii), based on the total parts by weight of the core resin equaling 100, and n is less than m so as provide a refractive index of greater than 1.53 and a high impact resistance after curing the composition.

2. The composition of claim 1 wherein
   (a) component (i) comprises at least 5 parts by weight of the composition of (1) the first compound or (2) a mixture of two or more first compounds, and n is from 0–4; and
   (b) component (ii) comprises 10–75 parts by weight of the composition of (1) the second compound or (2) a mixture of two or more second compounds, and m for each second compound is at least 5.

3. The composition of claim 1, wherein
   (a) component (i) comprises at least 30 parts by weight of the composition of the first compound, and n is 1, and
   (b) component (ii) comprises 20–65 parts by weight of the composition of the second compound, and m is 5.

4. The composition of claim 1, wherein
   (a) component (i) comprises at least 30 parts by weight of the composition of the first compound, and n is 1, and
   (b) component (ii) comprises 10 to 55 parts by weight of the composition of a mixture comprising two second compounds, wherein the value of m for one of the second compounds is 6, and the value of m for the other second compound is 15.

5. The composition of claim 1, wherein $R_1$ and $R_4$ are $CH_3$.

6. The high refractive index composition of claim 1 wherein, in formula (I), n is from 0–4, $R_1$ and $R_4$ independently represent H or $CH_3$, $R_2$ and $R_3$ are H, X is $C(CH_3)_2$, and $y_1$–$y_8$ are H; and in formula (II), m is at least 5, $R_1$ and $R_4$ independently represent H or $CH_3$, $R_2$ and $R_3$ are H, X is $C(CH_3)_2$, and $y_1$–$y_8$ are H.

7. The composition of claim 1, comprising 5–20 parts by weight of a reactive diluent, based on the total parts by weight of the core resin equaling 100.

8. The composition of claim 1, wherein the reactive diluent has a refractive index of 1.51 or higher.

9. The composition of claim 1, wherein the reactive diluent is styrene.

10. The composition of claim 1, wherein the composition is radiation curable.

11. The composition of claim 1, wherein the composition is ultraviolet radiation curable.

12. The composition of claim 1, wherein the composition is thermally curable.

13. The composition of claim 1, further comprising 0.01–2.0 parts by weight of the composition of a ultraviolet initiator per 100 parts by weight of the core resin.

14. The composition of claim 13, wherein the UV initiator is selected from the group consisting of benzophenone, 2,2-dimethoxy-2-phenyl acetophenone, 1-hydroxycyclohexyl phenyl ketone, 2-methyl-1-[4-(methylthio)phenyl]-2-morpholino propan-1-one, 2-hydroxy-2-methyl-1-phenyl-propan-1-one, bis(2,6-dimethoxybenzoyl)-2,4,4-trimethylpentyl phosphine oxide, 2,4,6-trimethylbenzoyl diphenylphosphine oxide, bis(2,4,6-trimethylbenzoyl)-phenylphosphine oxide and mixtures thereof.

15. The composition of claim 13, wherein the UV initiator comprises a mixture of 2,4,6-trimethylbenzoyl diphenylphosphine oxide and 2-hydroxy-2-methyl-1-phenyl-propan-1-one.

16. The composition of claim 13, wherein the UV initiator is a mixture of 2,4,6-trimethylbenzoyl diphenylphosphine oxide and 2-hydroxy-2-methyl-1-phenyl-propan-1-one in a weight ratio of 1/9–9/1.

17. The composition of claim 1, further comprising up to 1.0 part by weight of thermal initiator per 100 parts by weight of the core resin.

18. The composition of claim 17, wherein the thermal initiator is selected from the group consisting of t-amyl peroxy-2-ethylhexanoate, t-butyl peroxy-2-ethylhexanoate, t-butyl peroxyl-2-methylbenzoate, 1,1-di-(t-butylperoxy)-3,3,5-trimethylcyclohexane, t-butyl peroxy-3,5,5-trimethylhexanoate, t-butyl peroxy 2-ethylhexyl carbonate, dibenzoyl peroxide, t-amyl peroxy benzoate and mixtures thereof.

19. The composition of claim 17, wherein the thermal initiator is t-amyl peroxy-2-ethylhexanoate, t-butyl peroxy-2-ethylhexanoate, t-butyl peroxy-3,5,5-trimethylhexanoate or a mixture thereof.

20. The composition of claim 1, further comprising a mixture of a ultraviolet initiator and a thermal initiator.

21. The composition of claim 1, further comprising up to 0.5 parts by weight of a ultraviolet absorber per 100 parts by weight of the core resin.

22. The composition of claim 21, wherein the UV absorber is 2-(3',5'-bis(1,1-dimethylpropyl)-2'-hydroxyphenyl)-2H-benzotriazole.

23. The composition of claim 21, having an inherent 100% ultraviolet B protection and at least 95% ultraviolet A protection up to 380 nm at the thickness of 1 mm.

24. The composition of claim 21, having an inherent UV protection of greater than 99% up to 380 nm at the thickness of 1 mm.

25. The composition of claim 1, further comprising up to 1 part by weight of a light stabilizer per 100 parts by weight of the core resin.

26. The composition of claim 25, wherein the light stabilizer is bis(1,2,2,6,6, -pentamethyl-4-piperidinyl) sebacatc.

27. The composition of claim 1, having a viscosity of less than 1000 cps at room temperature.

28. The composition of claim 1, having a viscosity less than 400 cps at room temperature.

29. The composition of claim 1, having an impact resistance that passes the Food and Drug Administration requirement with lenses of 1.0 mm center thickness after curing.

30. An article made from the composition of claim 1.

31. The article of claim 30, in the form of a lens or other optical element.

32. A high refractive index composition consisting essentially of:
   (a) a core resine comprising great than 70 parts by weight of the composition of a first compound or a mixture comprising two or more first compounds, wherein the first compound has the formula (I):

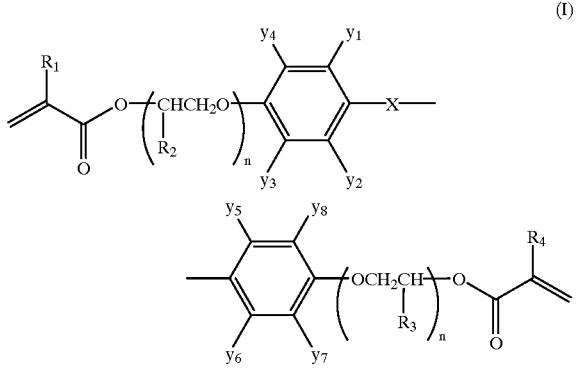

(I)

wherein n is from 0–30, $R_1$–$R_4$ independently represent H or $C_1$–$C_6$ alkyl, X is O, S, $SO_2$, $CO_2$, $CH_2$, CH=CH, $C(CH_3)_2$ or a single bond, and $y_1$–$y_8$ independently represent H, OH, halogen, mercaptan or $C_1$–$C_4$ alkyl, (ii) less than 30 parts by weight of the composition of a reactive diluent comprising 1,6-hexanedi ol di(meth) acrylate, trimethylolpropane tri(meth)acrylate, isobornyl (meth)acrylate, vinyl benzoate, vinyl 4-t-butyl benzoate, styrene, divinyl benzene or a mixture thereof, based on the total parts by weight of the core resin equaling 100; and (b) up to 2 parts by weight of an ultraviolet absorber per 100 parts by weight of the core resin.

33. An article made from the composition of claim 32.

34. The article of claim 33, in the form of a lens or other optical element.

35. A method of forming a cured article comprising the steps of:
   (a) filling a mold with the composition as defined in claims 1, 6 or 32,
   (b) curing the composition of step (a) by exposure to a radiation source thereby forming a cured article;
   (c) demolding the cured article; and
   (d) annealing the cured article.

36. The method of claim 35, wherein the article is a lens.

37. The method of claim 35, wherein the mold is filled by injection through a gasket.

38. The method of claim 35, wherein step (b) is effected in 15 minutes or less.

39. The method of claim 35, wherein the radiation source provides UV radiation for curing the composition.

40. The method of claim 35, wherein the radiation source is a grid, mercury, xenon, or other actinic light source.

41. The method of claim 35, wherein step (d) is effected in 15–30 minutes at a temperature of from 150 to 300° F.

* * * * *